June 21, 1932.  J. W. LISTERMAN  1,863,665
SHOCK ABSORBER
Filed Feb. 12, 1931
Fig. 1.
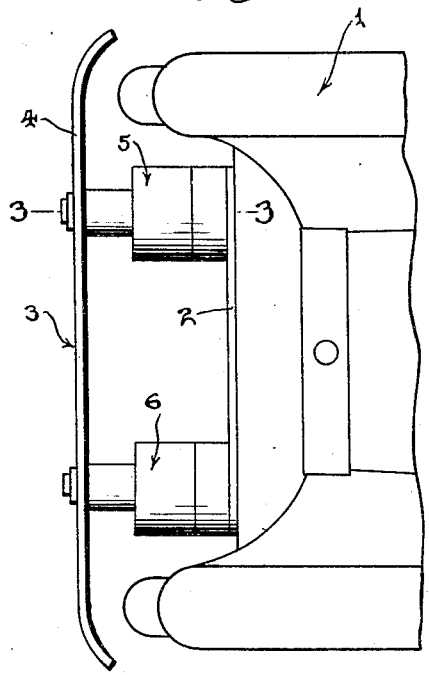
Fig. 2.
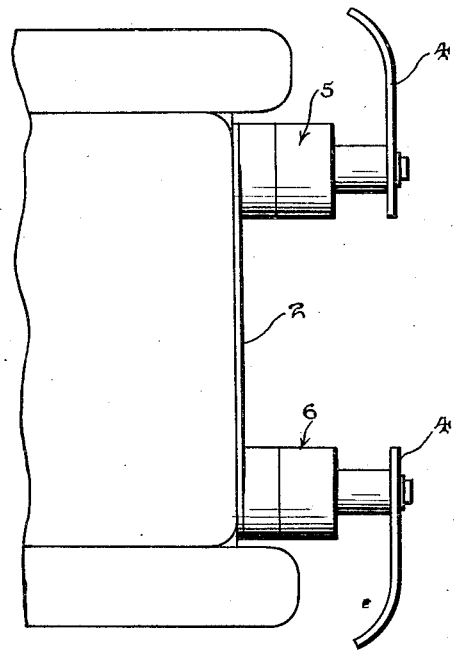
Fig. 3.
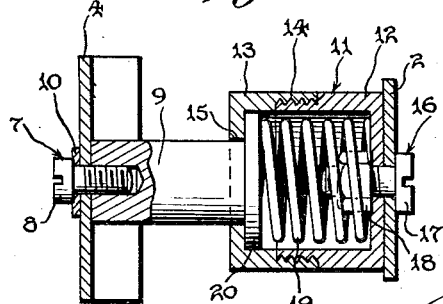
Fig. 4.
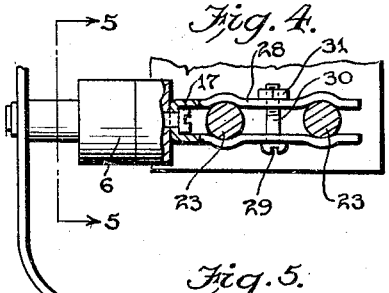
Fig. 5.
Fig. 6.
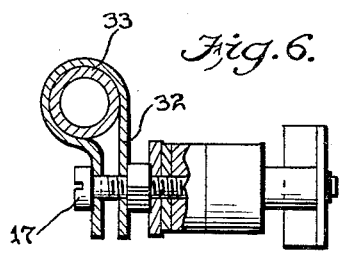
Fig. 7.
Inventor
John W. Listerman,
by
Harry W. Johnson
Attorney Patented June 21, 1932

1,863,665

UNITED STATES PATENT OFFICE

JOHN W. LISTERMAN, OF PUEBLO, COLORADO

SHOCK ABSORBER

Application filed February 12, 1931. Serial No. 515,323.

My invention relates to shock-absorbers, more particularly to shock-absorbers for use on automobiles of conventional construction, and it consists in the combinations, arrangements and constructions herein shown and described.

It is well known to automobile drivers of today that the shock-absorbers in current use do not withstand heavy shocks impinging thereupon, but often give way with consequent damage to the vehicles. It is therefore a primary purpose of my invention to provide a shock absorber which is so constructed that the same will withstand shocks of great magnitude without material damage resulting thereto or to the vehicle.

It is a further object of my invention to provide a shock-absorber that may be readily and easily assembled and disassembled for renewal or repair of parts when necessary, or for other reasons, if desired.

A still further and very important object of my invention is to provide a shock-absorber having a mounting means which will adapt said shock-absorber to be positioned upon present-day automobiles without modification thereof.

A still further object of my invention is to provide a device of the type described which has few parts, does not get out of order readily, and is simple to manufacture.

Other objects and advantages will appear as the specification proceeds, and the device will be more particularly defined in the appended claims.

My invention is illustrated in the accompanying drawing forming a part of this application, in which Figure 1 is a fragmentary plan view of the front portion of an automobile equipped with my invention.

Figure 2 is a fragmentary plan view of the rear portion of an automobile equipped with my invention, Figure 3 is a sectional view on line 3—3 of Figure 1, with parts thereof being shown in elevation for clearness of illustration.

Figure 4 is a fragmentary horizontal sectional view of my invention and one of the specific mounting means therefor, Figure 5 is a sectional view on line 5—5 of Figure 4, showing the entire mounting means, Figure 6 shows my invention with a modified form of mounting means for securing the same to an axle of an automobile, and Figure 7 is a top plan fragmentary view of my invention equipped with a modified form of mounting means for securing the same to the gas tank of an automobile, with parts of my device shown in section for clearness of illustration.

In carrying out my invention, I make use of an automobile, 1, of conventional construction, having a portion of the frame or chassis, 2, extending transversely of the front or rear thereof. It is to this portion, 2, of the frame or chassis, 1, that I secure my shock-absorbing means, generally indicated at 3.

This front shock-absorbing means consists of a bumping member, 4, and a pair of shock-absorbing mounting means, 5 and 6, secured to said bumping portion, 4, by the bolt and washer arrangement, generally indicated at 7, and comprising the bolt, 8, which screws into the plunger, 9, of the shock-absorbing device, 5 or 6, and the lock washer, 10, positioned between the bolt head and the bumper member, 4.

Each of these shock-absorbing members, 5 or 6, comprises the plunger portion, 9, and the barrel portion, 11. These barrel portions, 11, consist of a pair of interfitting cup-shaped members, 12 and 13, adapted to be fastened securely together by means of the threads shown at 14. The cup-shaped member, 13, is provided with an aperture, indicated at 15, for the reception of the plunger, 9, while the cupshaped member, 12, is also provided with an aperture for reception of the nut and bolt fastening means, generally indicated at 16, which secures the shock-absorbing member to the portion of the frame 2. This nut and bolt means, 16, comprises the bolt, 17, and the nut, 18, mounted thereon. A lock washer (not shown) may be positioned between the nut, 18, and the end wall of the cup portion, 12, for securing the parts in position if desired.

For absorbing the shocks impinging upon the bumper, 4, the barrel, 11, houses therein the resilient means, comprising the coil compression spring, 19. This spring, 19, may be secured at one end between the nut, 18, and the end wall of the cup portion, 12, if desired, or it may merely abut the end wall, 12. The opposite end thereof engages the flanged head, 20, of the plunger, 9, for resiliently supporting the plunger in extended position and for absorbing shocks when said plunger is depressed into the barrel.

If desired, a third shock-absorbing means similar to the means 5 or 6 may be positioned between the frame portion, 2, and the bumper, 4, intermediately between the absorbers, 5 or 6. If desired, of course, any plurality of such shock-absorbing means could be positioned between said frame and said bumper.

When it is desired to mount the shock-absorber on automobiles not equipped with a transversely extending frame portion or other equivalent structure, the mounting means shown in Figures 4 and 5 is utilized.

This mounting means comprises an upper plate member, 21, and a lower plate member, 22, between which extend two pairs of vertical posts, 23, having shoulders, indicated at 24, for securing said plates in spaced relationship. Any desired fastening means, such as the bolts, 25, may be utilized for securing these parts in position. As shown most clearly in Figure 5, this mounting means is secured to the base or floor, 26, of the automobile or other vehicle by means of the bolt members, 27, or other suitable fasteners, extending through said base. It is easily understood that the mounting means may be positioned either on the front or rear of the automobile or other vehicle. The shock-absorbing means, 5 or 6, in this modification is secured to its respective pair of posts, 23, by means of the clamp, indicated at 28, which as shown, may consist of a bent strap of metal engageable about said post members and with the bolt, 17, of the shock-absorbing means 6. This strap, 28, is held in tight-fitting relationship with said posts by means of a bolt and nut means, generally indicated at 29, consisting of the bolt, 30, and the nut, 31. A suitable lock washer may be provided for this arrangement, if desired.

In that form of the invention shown in Figure 6, the shock-absorber is provided with a mounting means which is especially adapted to secure the same to the front axles of automobiles of present construction which do not have a transversely extending portion of the frame for securing the same thereto, such as the late model Ford automobiles. In this form, the shock-absorber is equipped with a strap, 32, engageable with and secured in position by the bolt, 17, which is a part of the shock-absorber. This strap, as appears in said figure, engages about the axle, 33, for rigidly securing the shock-absorbing means in position thereon. Of course, the number of straps used is equal to the number of shock-absorbing members, 5 or 6, utilized.

In that form of the invention shown in Figure 7, the shock-absorbing means is provided with a mounting member, 34, which engages with the tank portion, 35, of the automobile, and is secured thereto by any suitable fasteners such as illustrated at 36. The absorber is secured thereto at the central portion thereof by the bolt, 17.

From the foregoing description, the use and operation of my device is easily understood. When the absorber is mounted as heretofore set forth, the shocks impinging upon the bumper portion, 4, will depress the plunger, 9, within the barrel, 11, against the resiliency of the spring, 19, whose power may be so calculated as to withstand any normal shock. Stresses and strains acting to move the pistons, 9, laterally will be taken care of by the engagement of the head thereof within the barrel member and absorbed by the rigid portions as well as the spring of the apparatus.

When the operator desires to disassemble or assemble the device, he has only to unscrew or screw together the interfitting cup members, 12 and 13, whereupon the parts are disassembled or assembled as desired.

It is thus seen that I have provided a shock-absorber which, because of its simple piston and barrel construction, may be formed to withstand shocks of any normal magnitude, and which is further particularly well adapted to be mounted upon automobiles and other vehicles of specific construction in use today.

What I desire to claim and secure by Letters Patent is:

1. A shock-absorbing means for use on automobiles and the like, comprising a bumper, resilient means for mounting said bumper, and means for securing said resilient means to the floor of the automobile or other vehicle, consisting of horizontally extending walls, one of said walls being connected to the base of the automobile, vertically extending posts between said horizontally extending walls, and straps engageable about said vertically extending posts and with said resilient means.

2. A shock-absorbing means for use on automobiles and the like, comprising a bumper, posts secured to the automobile, and strap means connected to said bumper and fastened about said posts for mounting said bumper in position.

3. A shock-absorbing means for use on automobiles and the like, comprising a bumper, vertical posts secured to the automobile, and means connected to said bumper and said posts for mounting said bumper in position.

4. A shock-absorbing means for use on automobiles and the like comprising a bumper, posts secured to the automobile, and straps connected to said bumper and said posts for mounting said bumper in position, each of said straps being passed about a plurality of said posts.

JOHN W. LISTERMAN.